United States Patent
Chan et al.

(10) Patent No.: US 12,292,080 B2
(45) Date of Patent: *May 6, 2025

(54) BALL HEAD WITH ANTI-ROTATION SELF-ALIGNING INTERFACE

(71) Applicant: Really Right Stuff, LLC, Lehi, UT (US)

(72) Inventors: Verent Chan, Lehi, UT (US); Joseph M. Johnson, Sr., Lehi, UT (US)

(73) Assignee: Really Right Stuff LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,220

(22) Filed: Jul. 3, 2024

(65) Prior Publication Data
US 2024/0352962 A1    Oct. 24, 2024

Related U.S. Application Data

(63) Continuation of application No. 17/474,882, filed on Sep. 14, 2021, now Pat. No. 12,055,180.

(60) Provisional application No. 63/149,033, filed on Feb. 12, 2021.

(51) Int. Cl.
*F16C 11/10*     (2006.01)

(52) U.S. Cl.
CPC ................................. *F16C 11/106* (2013.01)

(58) Field of Classification Search
CPC ....... F16C 11/10; F16C 11/103; F16C 11/106;
F16B 7/02; F16B 7/0406; F16B 7/0426;
F16B 7/182; Y10T 403/32254; Y10T
403/32262; Y10T 403/32286; Y10T
403/32426

See application file for complete search history.

(56) References Cited

U.S. PATENT DOCUMENTS

| | | | | |
|---|---|---|---|---|
| 107,033 | A * | 9/1870 | Gale | F16C 11/10 403/97 |
| 5,404,182 | A * | 4/1995 | Nomura | F16M 11/14 248/920 |
| 6,106,181 | A * | 8/2000 | Neuhof | F16C 11/10 16/382 |
| 7,739,824 | B1 | 6/2010 | Swan | |
| 8,438,965 | B2 | 5/2013 | Collin | |
| 8,499,484 | B2 | 8/2013 | Schneider | |
| 9,480,326 | B2 * | 11/2016 | Stephens | A45F 5/00 |
| 10,060,468 | B2 * | 8/2018 | Whitney | E04F 10/0614 |
| 10,632,923 | B2 * | 4/2020 | Lang | F16C 11/10 |
| 10,926,829 | B2 * | 2/2021 | McGowan | B62K 21/18 |

(Continued)

*Primary Examiner* — Jonathan P Masinick
(74) *Attorney, Agent, or Firm* — Chernoff, Vilhauer, McClung & Stenzel LLP

(57) ABSTRACT

A head suitable to be supported by a tripod or a monopod includes a rotatable ball contained within a body defining a socket where the rotatable ball includes a shaft extending therefrom suitable to attach to a retainment structure to support a device thereon. A first movable member selectively increases and decreases the ability of the ball to freely rotate. A terminal end of the shaft includes a retainment structure that includes at least four angularly arranged "V" shaped members protruding from the terminal end, where each of the "V" shaped members extends over 90 percent of the distance from a central opening defined by the shaft and an exterior peripheral surface defined by the shaft.

11 Claims, 16 Drawing Sheets

(56) References Cited

U.S. PATENT DOCUMENTS

| | | | |
|---|---|---|---|
| 11,085,736 B2 | 8/2021 | Johnson, Sr. | |
| 2004/0179891 A1* | 9/2004 | Watkins | F16C 11/10 |
| | | | 403/96 |
| 2006/0285915 A1* | 12/2006 | Dellach | F16M 11/12 |
| | | | 403/92 |
| 2008/0210832 A1* | 9/2008 | Speggiorin | F16P 1/00 |
| | | | 248/183.1 |
| 2013/0163978 A1* | 6/2013 | Carlesso | F16M 11/14 |
| | | | 396/428 |
| 2014/0112702 A1* | 4/2014 | Mighells | F16C 11/10 |
| | | | 403/92 |
| 2016/0076583 A1* | 3/2016 | Karai | F16C 11/0609 |
| | | | 248/278.1 |
| 2016/0266601 A1* | 9/2016 | Christensen | G05G 5/12 |
| 2017/0337789 A1* | 11/2017 | Rosenkvist | F16M 13/02 |
| 2018/0106416 A1* | 4/2018 | Karai | F16M 11/14 |
| 2018/0164662 A1* | 6/2018 | Olmos-Calderon | F16M 11/041 |
| 2018/0320813 A1* | 11/2018 | Karman | G03B 17/561 |
| 2019/0271902 A1* | 9/2019 | Chan | F16M 11/041 |
| 2021/0108892 A1 | 4/2021 | Ma | |
| 2022/0390816 A1 | 12/2022 | Sepggiorin | |

\* cited by examiner

BALL HEAD WITH ANTI-ROTATION SELF-ALIGNING INTERFACE

CROSS REFERENCE TO RELATED APPLICATIONS

This application is a continuation of U.S. patent application Ser. No. 17/474,882, filed Sep. 14, 2021, which application claims the benefit of U.S. Provisional Patent Application No. 63/149,033, filed Feb. 12, 2021.

BACKGROUND

The subject matter of this application relates to anti-rotation self-aligning interface.

Photographic equipment may be mounted to a camera stand in a variety of ways. Some camera bodies, for example, have threaded sockets in their base so they can be directly mounted to a bolt that extends upwardly from the support. The camera body is positioned over the support so that the bolt fits within the socket and the camera body is spun around several times to screw the camera body to the support. Alternatively, and particularly when a heavy, elongate camera lens is attached to a camera body, the camera lens will include a support having a threaded socket positioned below the lens so that the lens may be mounted to the support in the same manner as a camera body.

A tripod head is suitable for supporting an optical instrument, such as a film camera or a video camera. Typically, the tripod head includes a generally cylindrical housing, which has a connection mechanism at one end for a tripod. A ball member in the housing is movably engaged and is provided with a locking device at one end thereof for supporting the optical instrument.

In the tripod head of this type, the ball member is generally a spherical ball having an extension for connecting to a locking device, and the locking device normally consists essentially of a split clamp having a recess adapted to mate with a plate attached to the optical instrument, and a clamping screw for securing the ball in place in the housing.

In many environments, a ball head or similar supporting device is used to support a rail assembly that is affixed to a rifle. In the case of a ball head, the rifle is adjusted in its orientation and the ball is secured in place to inhibit it from movement. While a rifle is discharged, a substantial amount of pressure is exerted against the ball head which retains the rifle in its place. To maintain the position of the ball head, the ball is often secured in place to near the maximum force that the ball head can withstand to prevent slippage of the ball.

Unfortunately, with increasingly amounts of pressure exerted as a result of securing a rifle thereto, the pressure tends to result in bending the interface between the ball head and the locking device.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
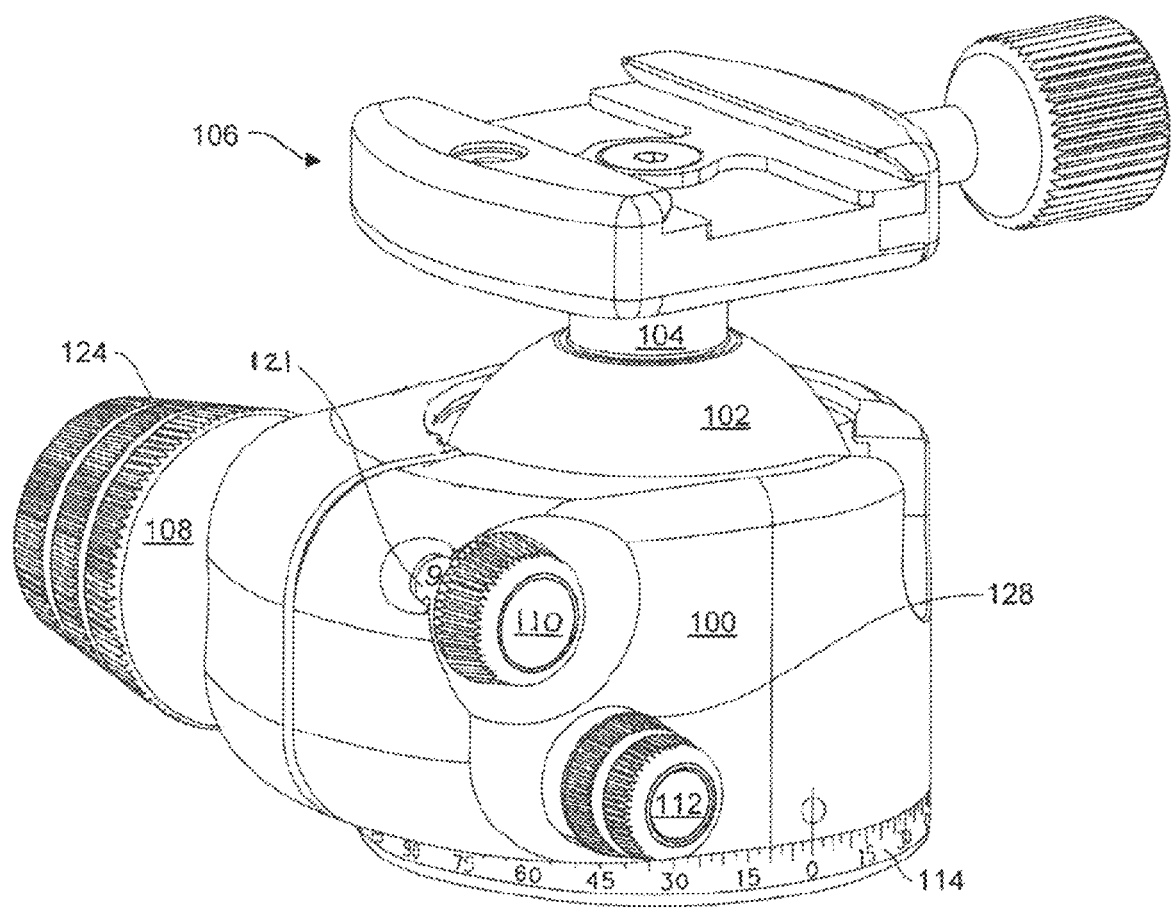
FIG. 1 is a pictorial view of a ball head.

Referring to FIG. 1 a tripod head includes a body 100 and a ball 102. The body 100 may have any suitable configuration and the ball 102 may be spherical, elliptical, or otherwise any other suitable shape. The ball 102 may include a stem 104 to which is attached a clamp 106. In many cases, the optical instrument includes a plate attached to the lower portion thereof. The plate it sized such that it is detachably engaged with the clamp 106, which selectively secures the plate. The clamp 106 may be of any configuration, or otherwise any device to secure a device thereto. In some cases, the stem 104 includes a threaded opening therein or a threaded screw, which is detachably attached to the optical instrument. A ball knob 108, when turned clockwise, causes the ball 102 to be engaged and held in place, and hence inhibit the ball 102 from being rotated. The ball knob 108, when turned counter-clockwise causes the ball 102 to be disengaged, and hence readily permit the ball 102 to be rotated. A friction knob 110, when turned clockwise causes the ball 102 to be increasingly inhibited in its ability to move freely. The friction knob 110, when turned counter-clockwise causes the ball 102 to be decreasingly inhibited in its ability to move freely. In operation, the friction knob 110 is primarily used to set a base friction on the ball 102 to inhibit its movement when the ball knob 108 is fully released by turning it counter-clockwise. Then after positioning the optical instrument, such as a camera, the ball knob 108 is turned fully clockwise which increases the friction on the ball 102, normally sufficiently to maintain the optical instrument in position. A pan knob 112, when turned counter-clockwise releases the body from a pan base 114, so that the body 100 may freely rotate in clockwise and counter-clockwise directions. Then pan knob 114, when turned clockwise engages the body 100 with the pan base 114, so that the body 100 may not freely rotate in a clockwise and a counter-clockwise direction.

The ball 102 is preferably spherical in shape, which are generally easier to manufacture and easier to assemble in the tripod head. In addition, the clamping mechanism on a spherical shaped ball 102 tends to be less likely to jam under adverse conditions, such as under cold conditions when the ball 102 tends to get sticky or when moisture tends to condense on the ball 102.

The ball knob 108, the friction knob 110, and the pan knob 112 are all partially recessed within a portion of the wall of the body 100. With a portion of the knobs 108, 110, and 112 terminating at a location partially with the body 100 then the knobs and any shafts attached thereto will have a significantly reduced likelihood of becoming snagged on a branch when the tripod head, attached to a tripod, is carried through a brushy region including smaller branches. For example, one test that may be used to determine if the knobs are properly situated with respect to the body 100 is to use a ¼ inch or ⅛th inch diameter flexible rod being dragged across the exterior of the body 100, and across the respective knob 108, 110, 112 (in one or both circular horizontal directions) in a manner similar to how a branch would drag across the exterior of the body 100. If the flexible rod does not get snagged in such a manner that the flexible rod must be moved backwards in order to continue over the respective knob 108, 110, 112, then the knobs are suitably recessed.

The friction knob 110 is supported on a shaft that includes a set of numerical numbers 121 written thereon that indicate the amount of friction. The numbers preferably go from 1 to 9, with a greater number indicating a greater friction. The numbers are also preferably located in a position at least partially within an opening in the body 100, which protects the numbers from being worn off during use. The friction knob 110 and the shaft are mechanically coupled in a direct relationship in such a manner that over time as the device wears, the numbers will still appear at the proper time. If the numbers were included on a separate member or a plastic insert around the shaft, then there is a higher likelihood that the separate member or insert will shift in a manner that the initial relationship between the numbers and the position of the friction knob 110 would change.

Figure 2:
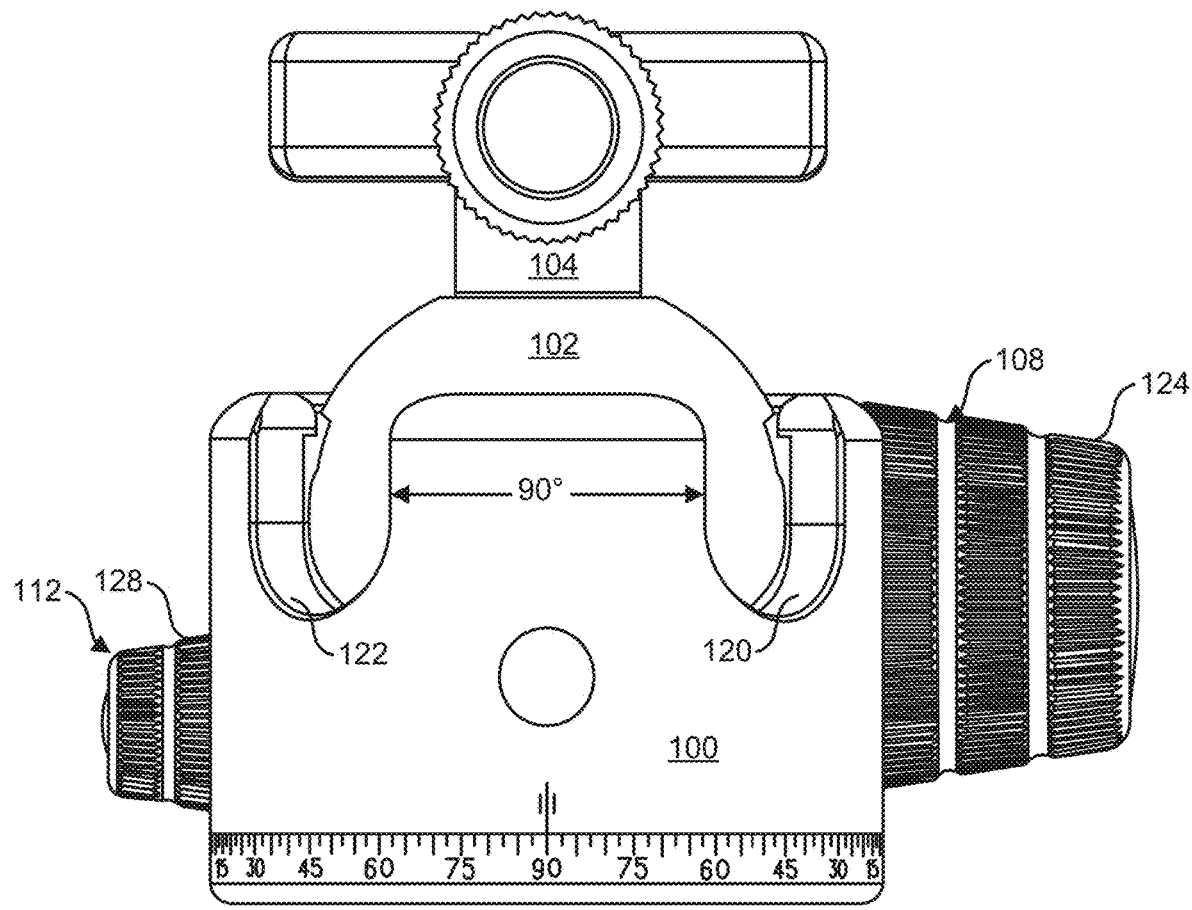
FIG. 2 illustrates a rear view of the ball head of FIG. 1.

Referring to FIG. 2, the body 100 defines a pair of drop notches 120 and 122. The ball 102 may be rotated such that the stem 104 ends up resting in either one of the drop notches 120 and 122. It is desirable to be able to move the stem 104 into a drop notch for changing the horizontal/vertical orientation of the camera (especially suitable for non-square film, such as 35 mm film) and for pointing the camera toward the ground with a minimal amount of camera rotation. In order to accommodate such movements, it was determined that a 90 degree spacing (or substantially 90 degrees) between the drop notches 120 and 122 are preferable. The spacing may likewise be between 80 and 100 degrees, if desired.

The ball knob 108 preferably has a diameter at its base that is greater than 75% of the height of the body 100. In this manner, the ball knob 108 is sufficiently large that photographers with gloves working in a cold environment are able to effectively operate the most important knob of the ball head. The threads 124, 128 on the respective knobs 108, 110, 112 permit a more positive grip on the knobs.

Figure 3:
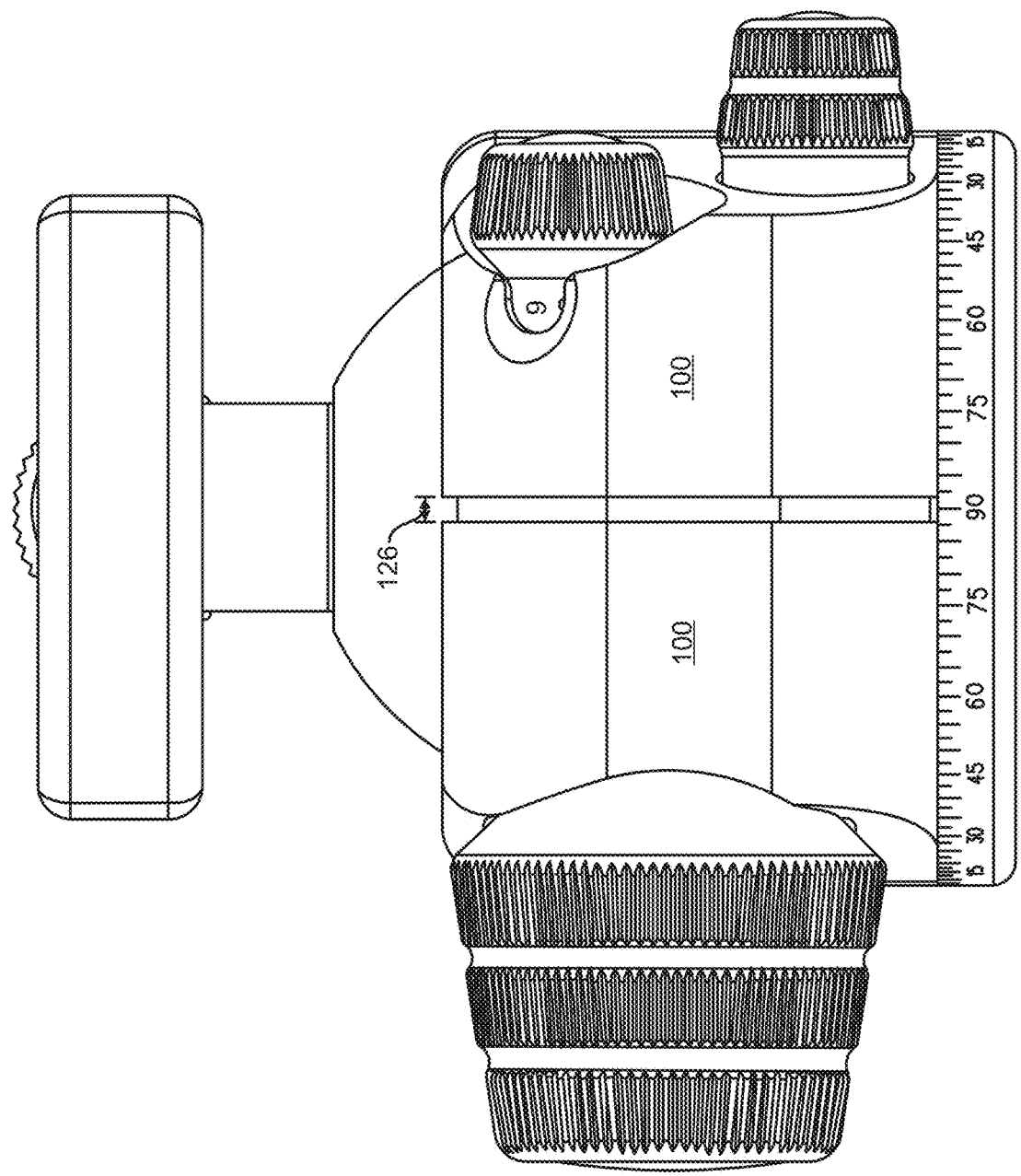
FIG. 3 illustrates a front view of the ball head of FIG. 1.

Referring to FIG. 3, the body 100 preferably defines one and only one slit 126 therein. By using a single slit 126 in the body 100, as opposed to multiple slits in the body, a more controlled squeezing action of the ball 102 may be performed. In addition, it limits the complexity of the device, which increases reliability. In addition, the ball knob 108 preferably goes from fully released to fully engaged in less than a single turn. By permitting the engagement and disengagement within a single turn facilitates quick and efficient locking of the ball 102 in place before the optical instrument moves. In addition, this increases the likelihood that the user will be able to go from unlocked to locked without having to remove his hand from the ball knob 108, thus performing the operation in a single twist of his wrist.

Figure 4:
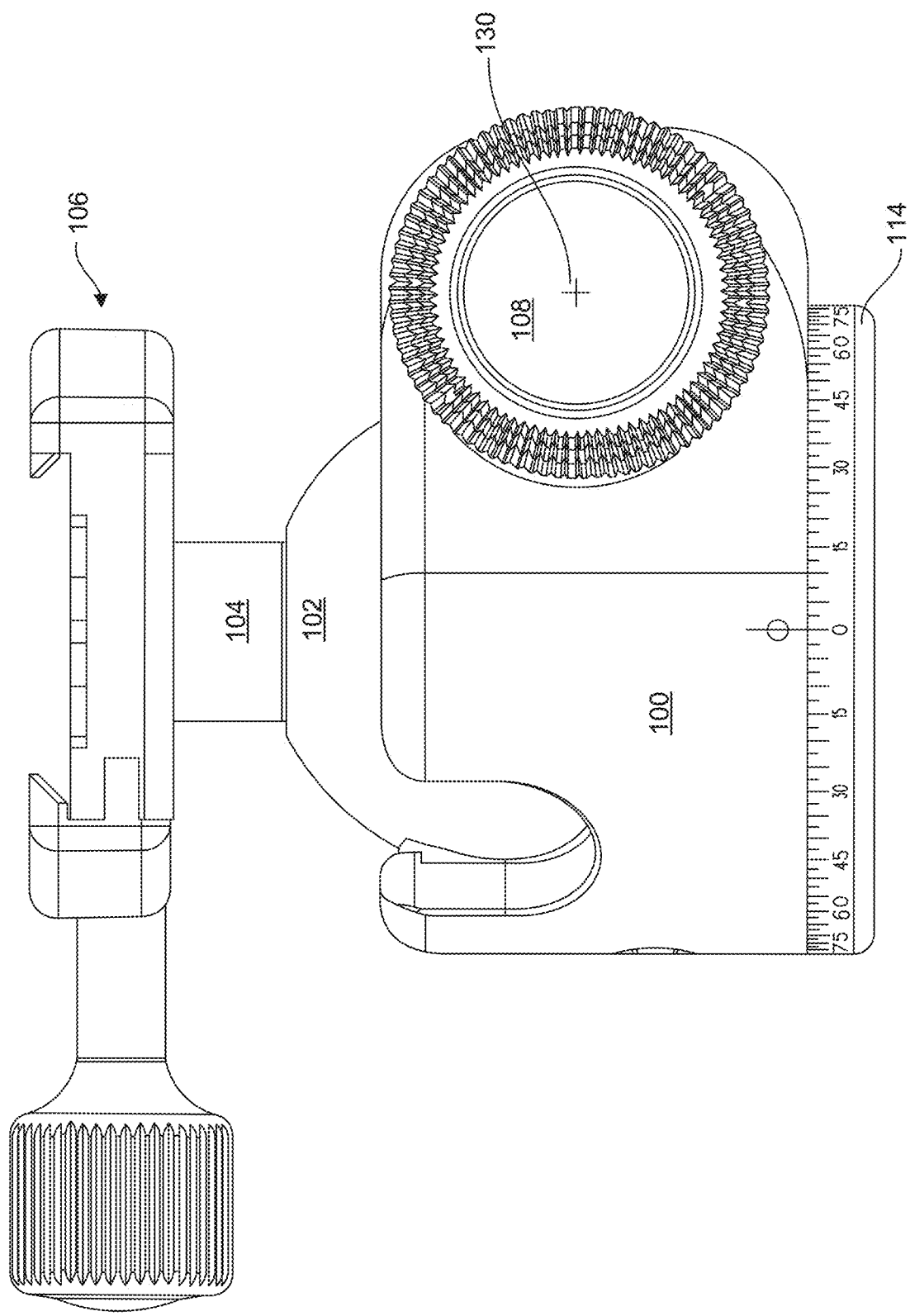
FIG. 4 illustrates a left side view of the ball head of FIG. 1.
Figure 5:
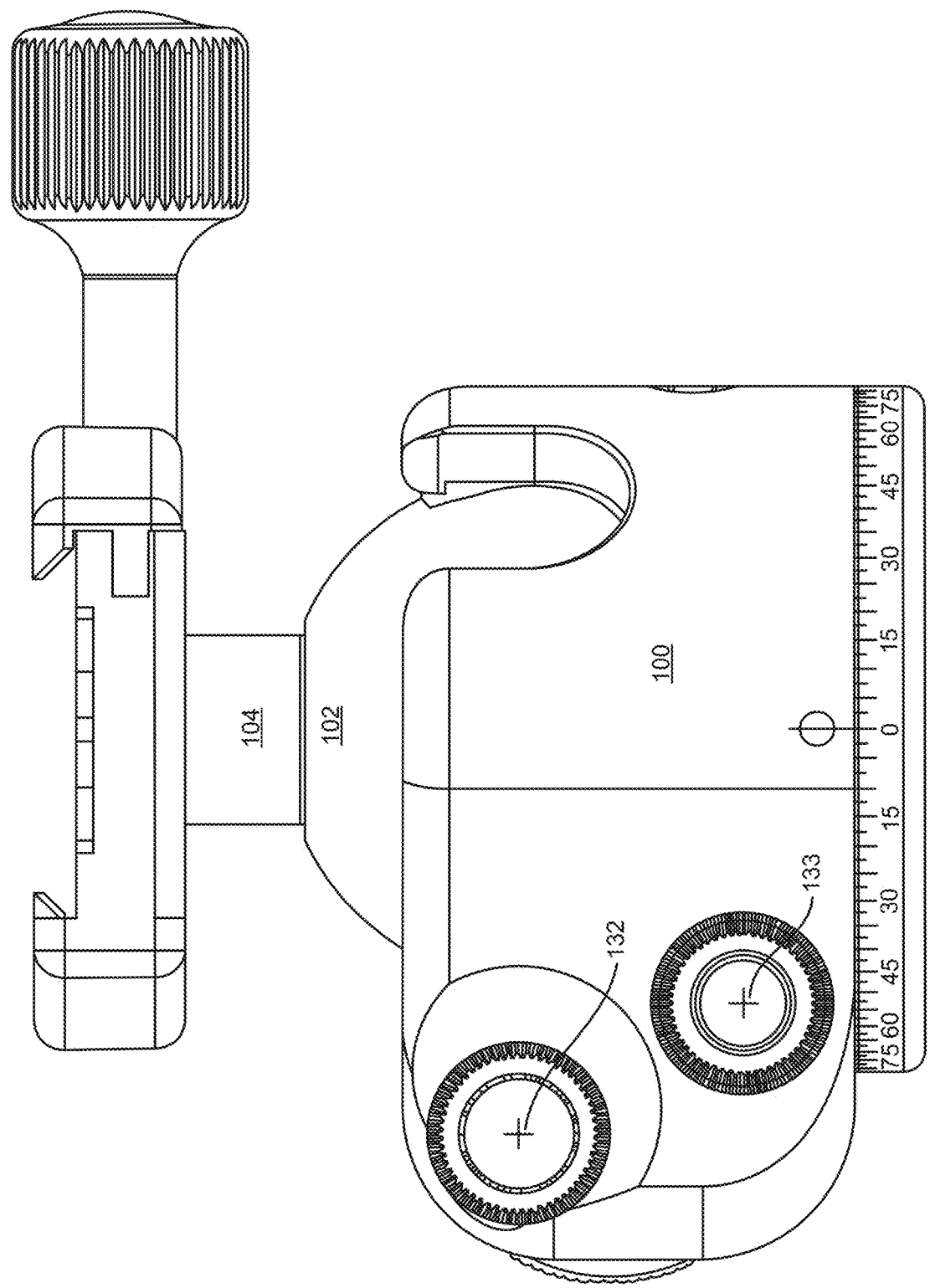
FIG. 5 illustrates a right side view of the ball head of FIG. 1.

Referring to FIGS. 4 and 5, the ball knob and the friction knob each have an axis of rotation 130 and 132 that is offset past the outer circumference of the pan base 114. By locating the axis 130, 132 offset past the pan base 114 a significant part of the mechanism for operation of the ball head is shifted to the side of the ball head thus permitting less operational mechanisms for the operation of the ball head to be directly above the pan base 114. With less operational materials directly above the pan base 114, the top of the ball 102 may be lower than it would otherwise be, thus decreasing the overall height of the tripod head. A shorter ball head reduces the amount of movement of the optical equipment as a result of vibration within the tripod.

Figure 6:
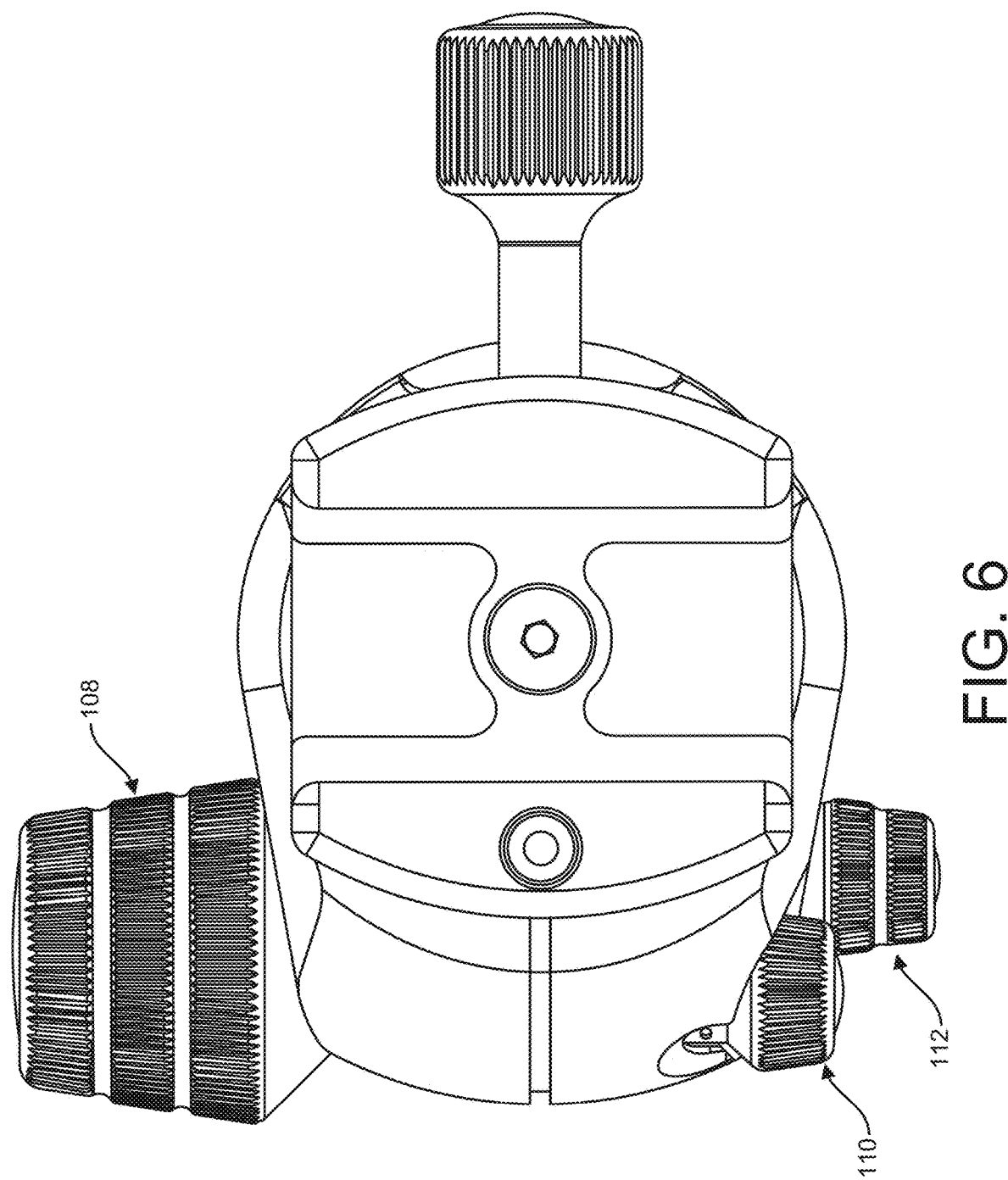
FIG. 6 illustrates a top view of the ball head of FIG. 1.

Referring to FIG. 6, it is also desirable to include the ball knob 108 in a position opposing the friction knob 110 and panning knob 108. In this manner, the friction knob 110 and panning knob 108 are not likely to be inadvertently moved when turning the ball knob 108 on a consistent basis. The axis of the ball knob 108 and the panning knob 108/friction knob 110 (axis 133) are preferably within 30 degrees of each other. In addition, the axis of said panning knob 108 and said friction knob 110 are preferably within 30 degrees of one another and more preferably parallel to one another.

Figure 7:
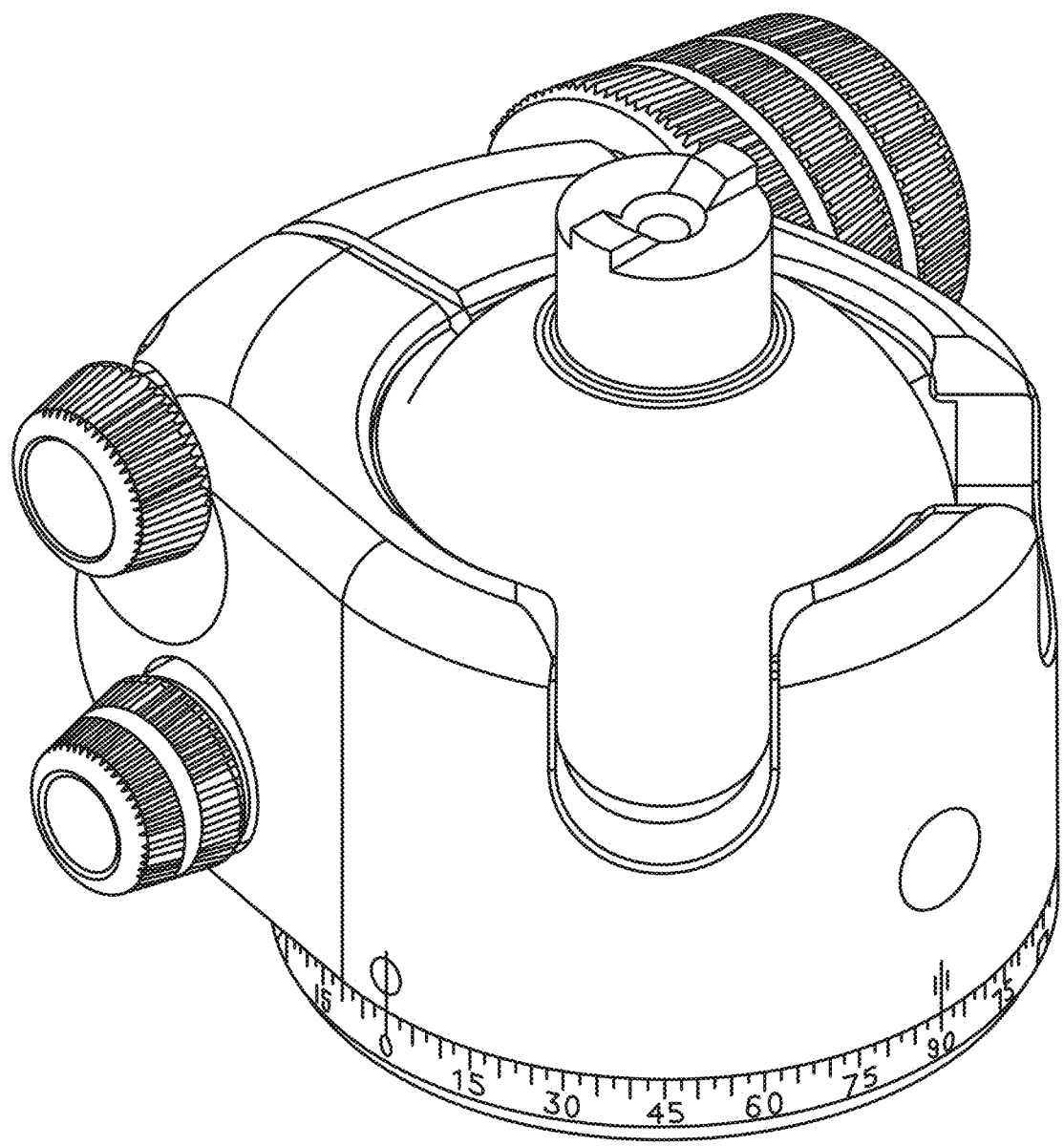
FIG. 7 illustrates a pictorial view of the ball head of FIG. 1 without a clamp.
Figure 8:
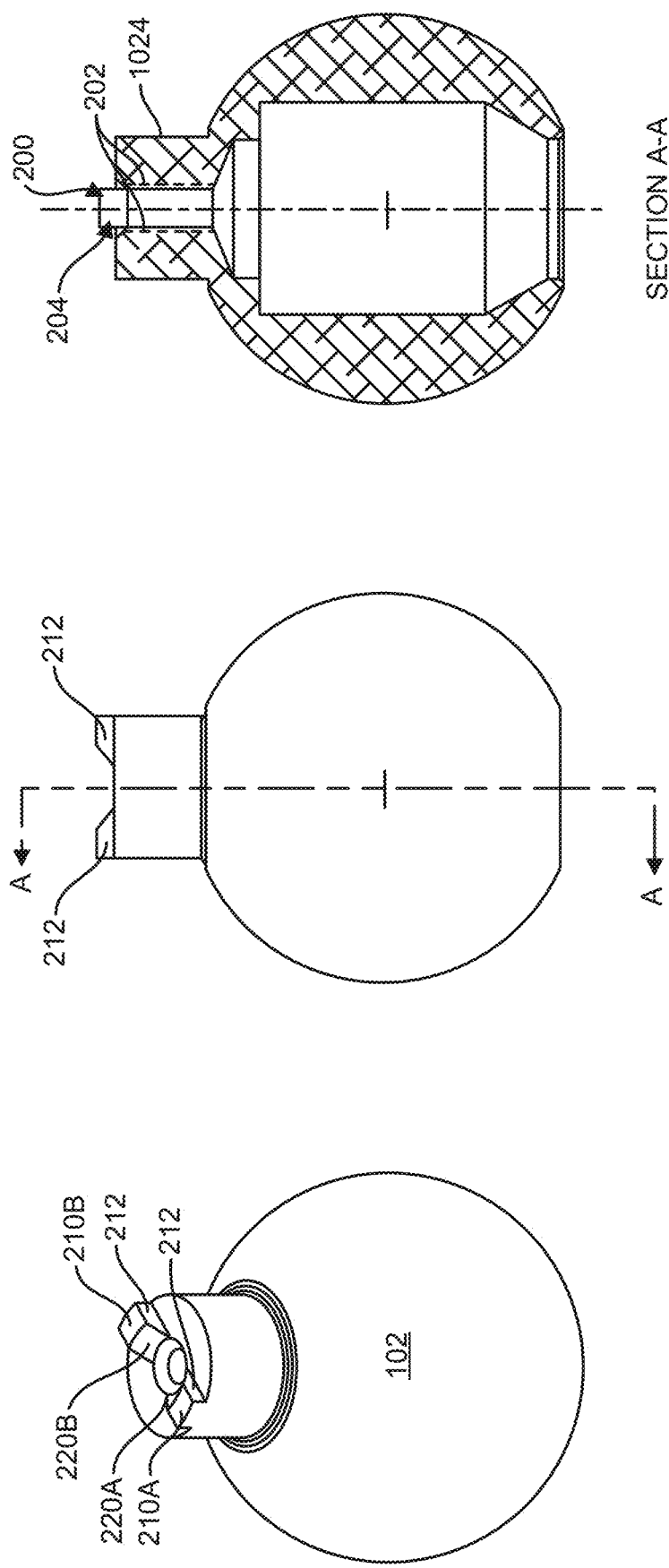
FIG. 8 illustrates a ball and stem for the ball head.

Referring to FIG. 7 and to FIG. 8, the ball head without a clamp 106 attached thereto is illustrated. The ball 102 may include the stem 104 that defines a central opening 200 in the end thereof with a set of threads 202 suitable for a screw to be engaged therewith in securing a structure to the stem 104. Also, the central opening 200 may include a smooth bore, if desired. The terminal portion of the stem 104 may include a pair of opposing tabs 210A, 210B. The opposing tabs 210A, 210B preferably include an exterior surface that is co-located with the exterior surface of the stem 104 to form a smooth surface. The opposing tabs 210A, 210B also preferably include a sloped surface 220A, 220B directed toward the opening 200. The opening 200 also preferably includes a circular inclined portion 204. The exterior surfaces 212 are preferably parallel to the axis of the shaft 104, or otherwise within 5 degrees of parallel. The screw is preferably designed such that it matingly engages with face-to-face surfaces with the inclined surfaces of the stem 104. The structure at the terminal portion of the stem 104 may be generally referred to as a "tongue". Other tongue structures may likewise be used, as desired. The clamp 106 includes a corresponding "groove" in its lower surface to receive the stem 104 and secure it in place against rotational movement.

When ball head is used in applications that generate a substantial amount of torque on the ball, the tongue and groove structure including only two "teeth" tends to be insufficient to transfer the torque to the ball and supporting structure of the head. When there is insufficient transfer of the torque, the stem tends to bend and permanently deform, resulting in the deterioration in performance and eventually rendering the device unusable. To increase the torque transfer between the clamp and the ball head so that the ball itself tends to slip in the socket before the stem deforms, the strength of the stem material and the ball may be increased, but this tends to increase the manufacturing time and/or cost of the ball and stem.

Figure 9:
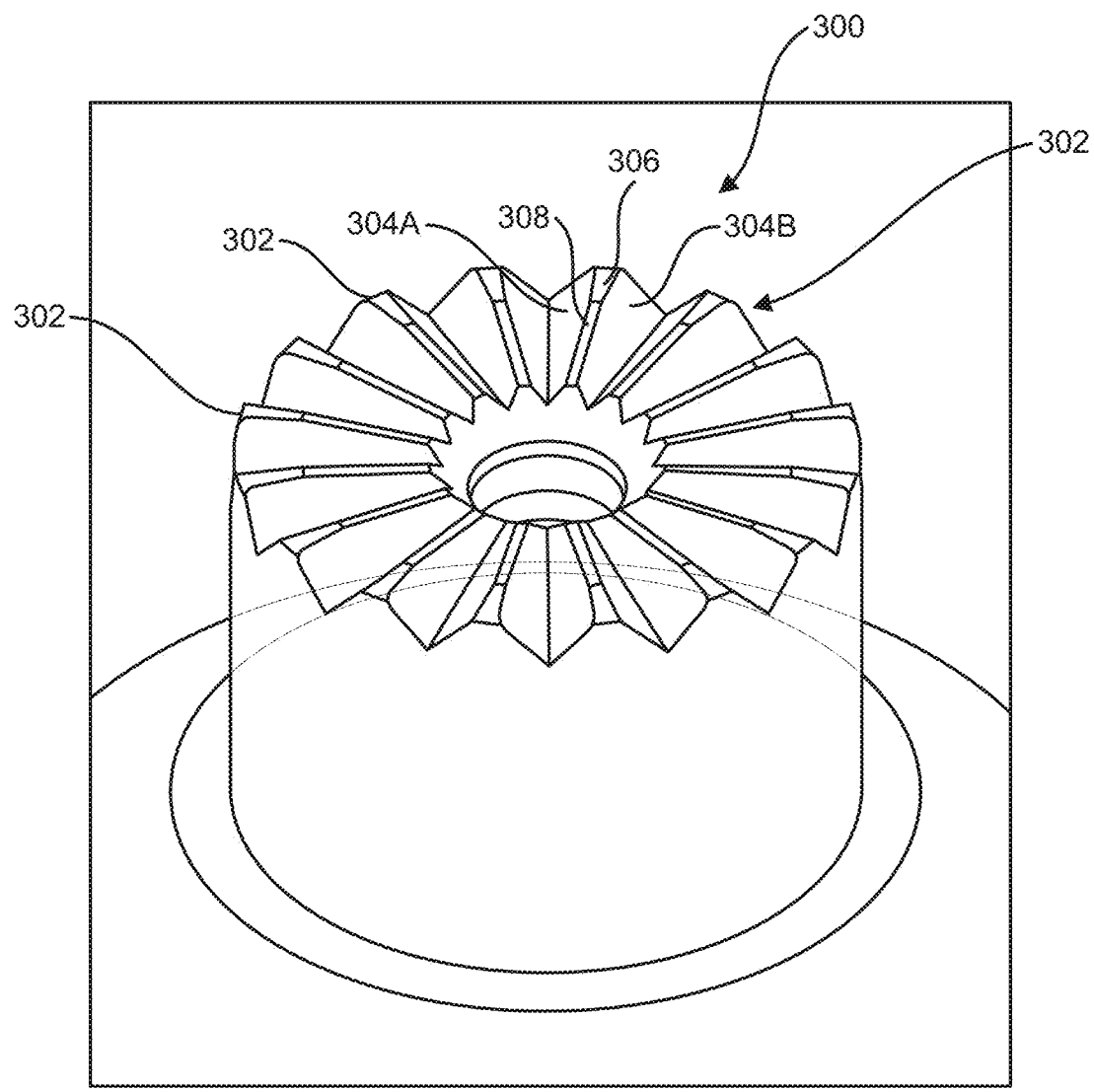
FIG. 9 illustrates a modified ball and stem for the ball head.

Referring to FIG. 9, a modified tongue 300 increases the transfer of torque from the clamp to the ball, and in particular the stem, may be achieved by increasing the number of "teeth" to at least 4 "teeth", more preferably at least 6 "teeth", more preferably at least 8 "teeth", and more preferably 16 or more "teeth". Each of teeth 302 may include a pair of opposing inclined surfaces 304A, 304B that are angled toward one another. The inclusion of the additional surfaces substantially increases the shear area. Each of the teeth 302 may include an upper flat surface 306 and an inclined upper surface 308. The upper flat surface 306 and the inclined upper surface 308 provide for a release from a corresponding groove and also reduce the likelihood of the upper portion of the teeth becoming damaged due to use.

When the ball head is used including two "teeth" results in a translational fit to provide reduced slop in the positional accuracy. The two "teeth" also rely on a friction on the face of the contact to provide the perception to the user of no positional slop. However, it is challenging to achieve sufficiently close tolerances from batch to batch of product production. Furthermore, the two "teeth" interface resists rotation tangential to the teeth but does not sufficiently resist movement in a direction aligned with the teeth.

As illustrated in FIG. 9, by using at least 3 teeth, the structure is self-aligning upon engagement and also constrained in all degrees of freedom when drawn together in compression, such as when secured together with a screw or a bolt. The teeth preferably extend from the outer periphery to the inner opening defined therein. The teeth preferably may also extend along 90 percent or more from the outer periphery to the inner opening defined therein. With the teeth extending this entire distance, or 90 percent or more, permits the engagement of different sized interface surfaces.

Figure 10:
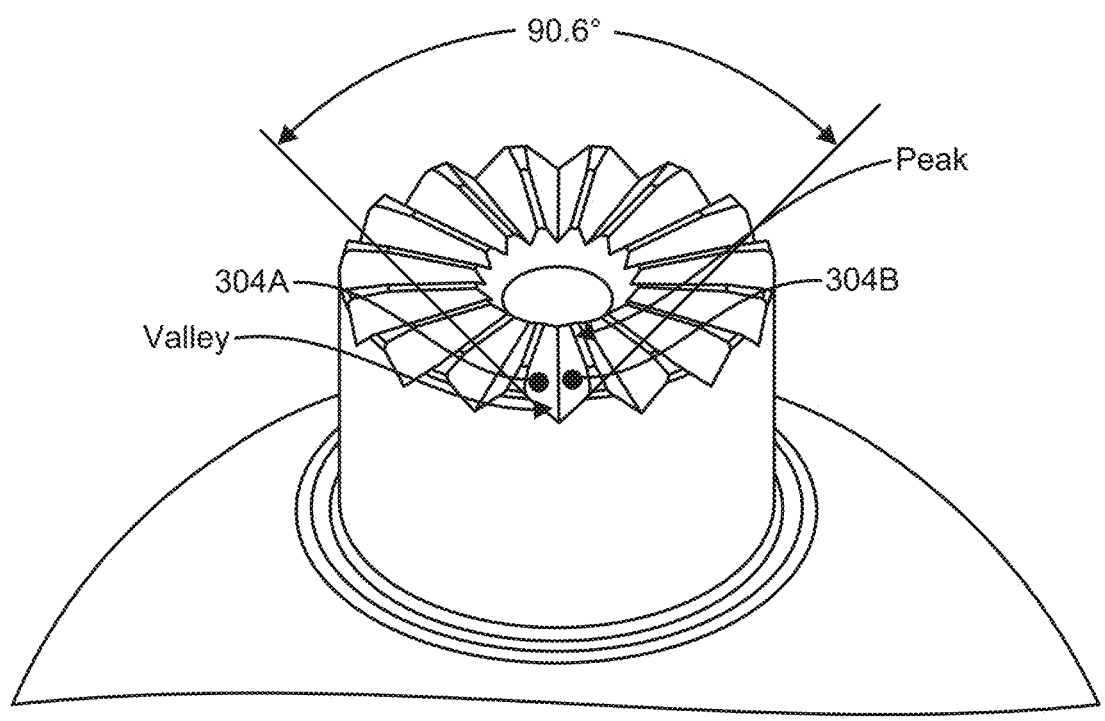
FIG. 10 illustrates the modified ball and stem for the ball head of FIG. 9.

Referring to FIG. 10, the interface may include symmetric angular contact surfaces on the interface that create face to face contact joined in a pair. The contact surfaces 304A, 304B mate with corresponding surfaces of the device supported thereon. The angle between the contact surfaces 304A, 304B is preferably between 88 and 93 degrees, more preferably between 90 and 91 degrees, and more preferably 90.6 degrees.

Figure 11:
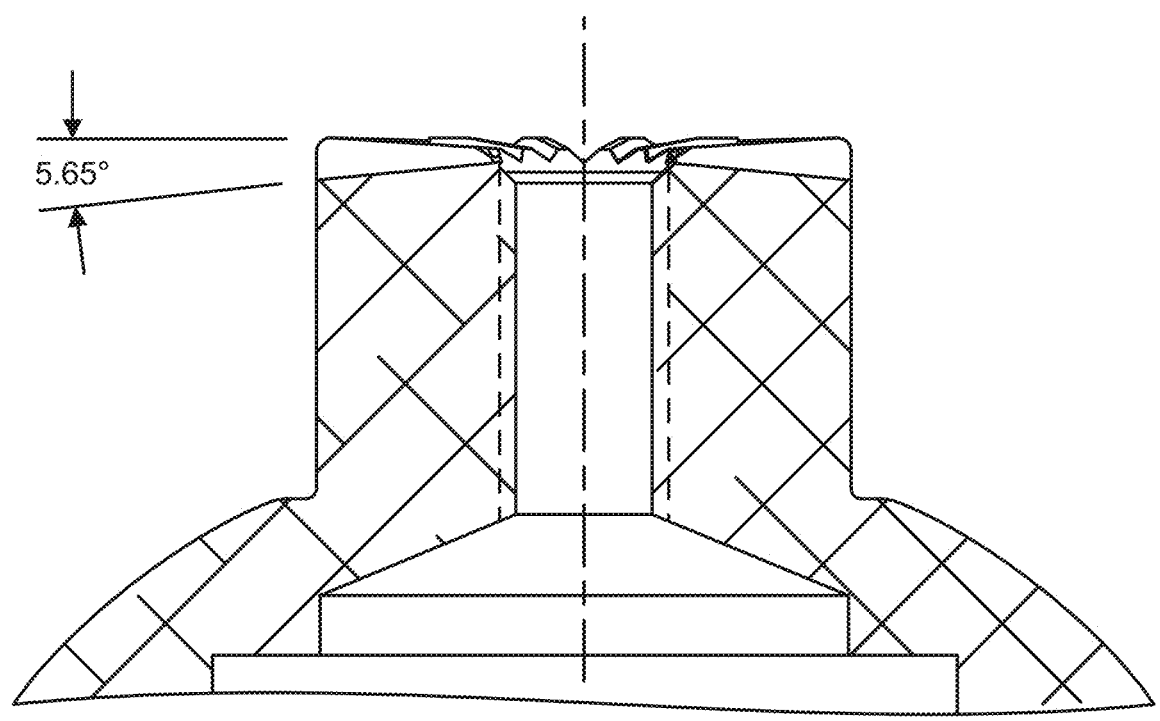
FIG. 11 illustrates a cross sectional view of the modified ball and stem for the ball head of FIG. 9.

Referring to FIG. 11, the angle of the valley is preferably sloped that is preferably between 1 and 10 degrees, more preferably between 3 and 8 degrees, more preferably between 5 and 6 degrees, and more preferably 5.65 degrees.

By having the contact faces be symmetric with one another, in operative portions, permits two parts with the same interface pattern to be joined without requiring "male" and "female" portions. The face-to-face engagement facilitates having two interface portions having different diameters. With the interface pattern starting at a common interior location, such as at the edge of an opening defined by the part, and the interface pattern being uniform around portions of the part, the same pattern may be created with different sized parts. For example, a first part may be 2 inches in diameter with a defined interface pattern. For example, a second part may be 4 inches in diameter with the same defined interface pattern as the 2 inch part, but with the interface pattern that is extended another 2 inches in diameter. With a 16 teeth pattern in an evenly spaced circular pattern provides positioning every 22.5 degrees. While a mechanical faster (e.g., a screw or a bolt) may be used to secure two faces together, a spring or magnet or other device may likewise be used to secure the two faces together.

Figure 12:
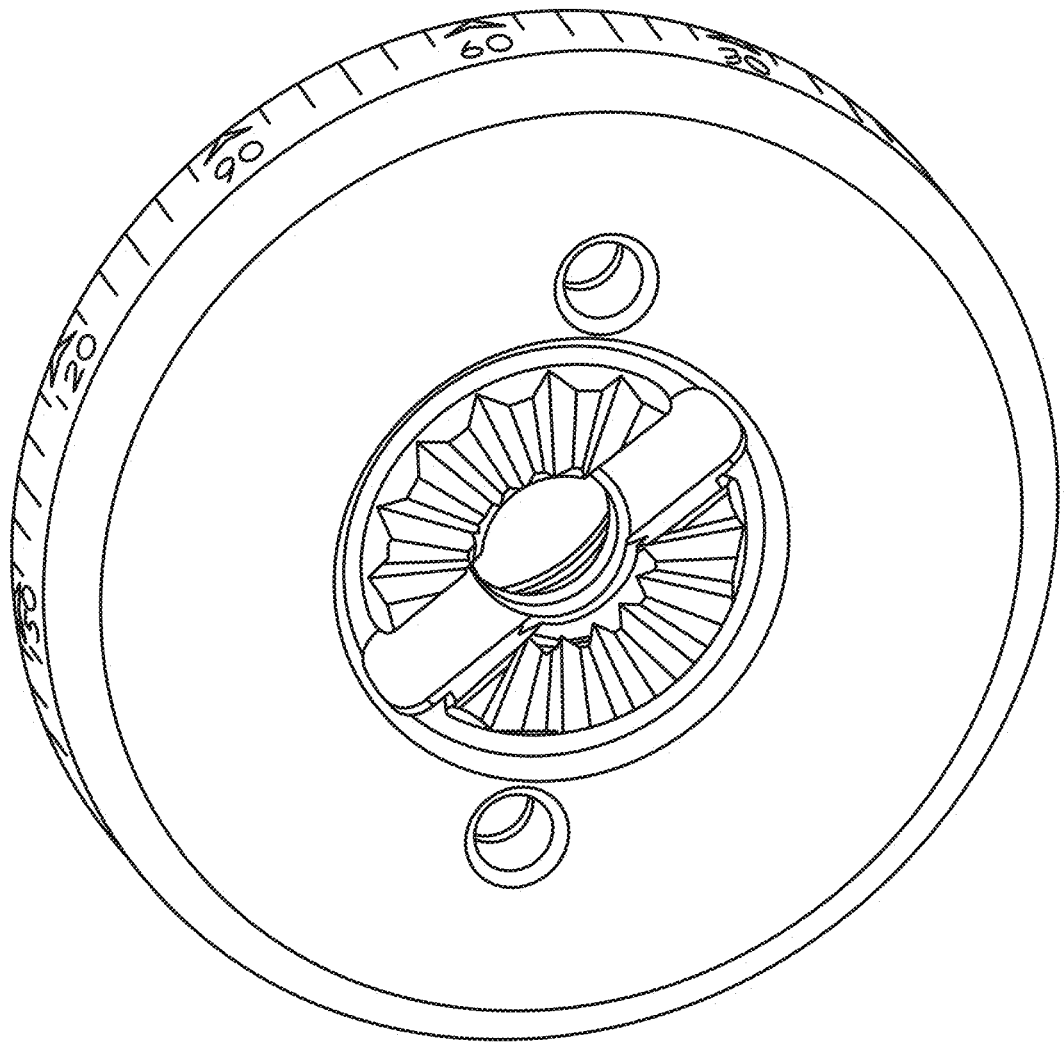
FIG. 12 illustrates a lower portion of a clamp for the modified ball and stem for the ball head of FIG. 9.
Figure 13:
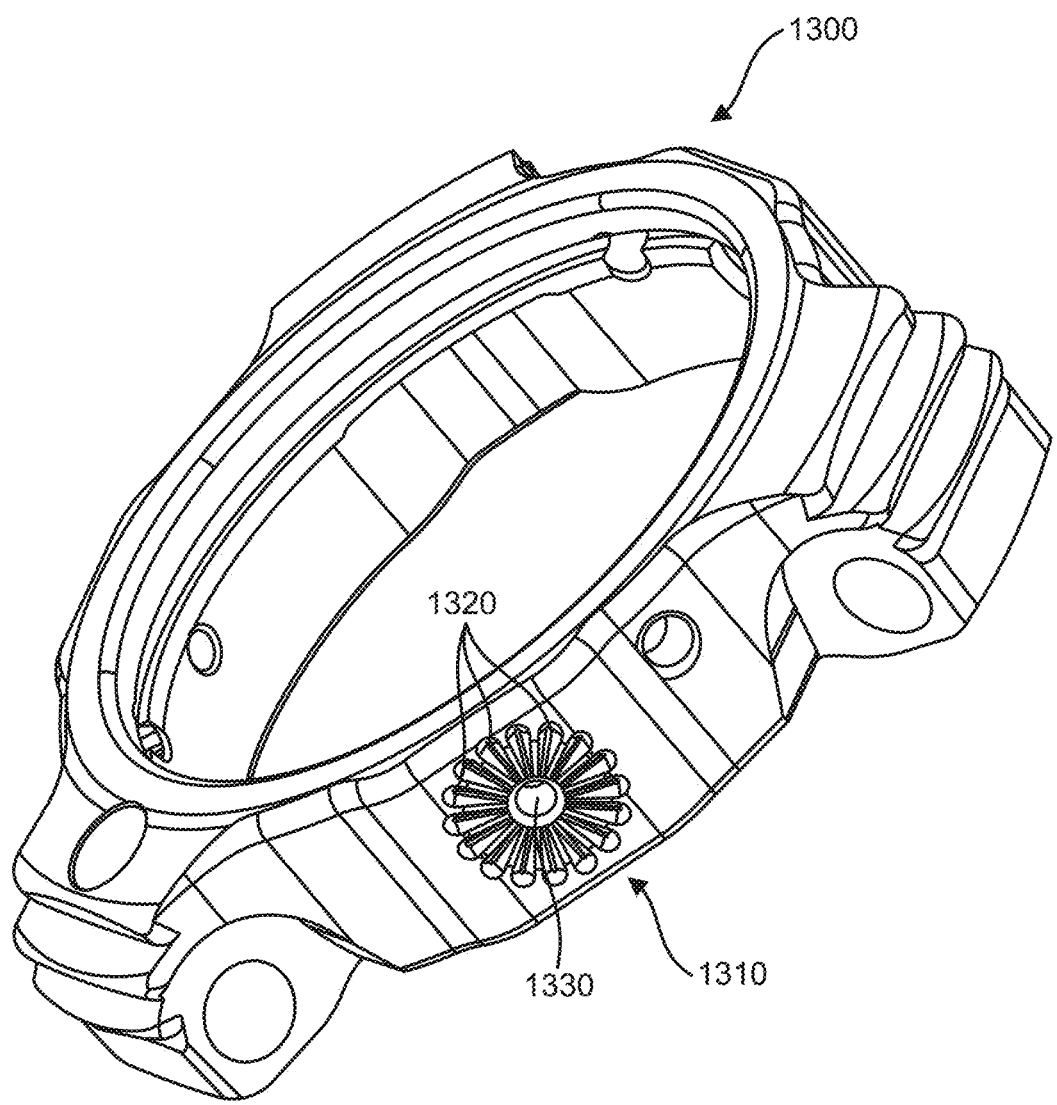
FIG. 13 illustrates one view of an apex for a tripod that includes a modified mount.
Figure 14:
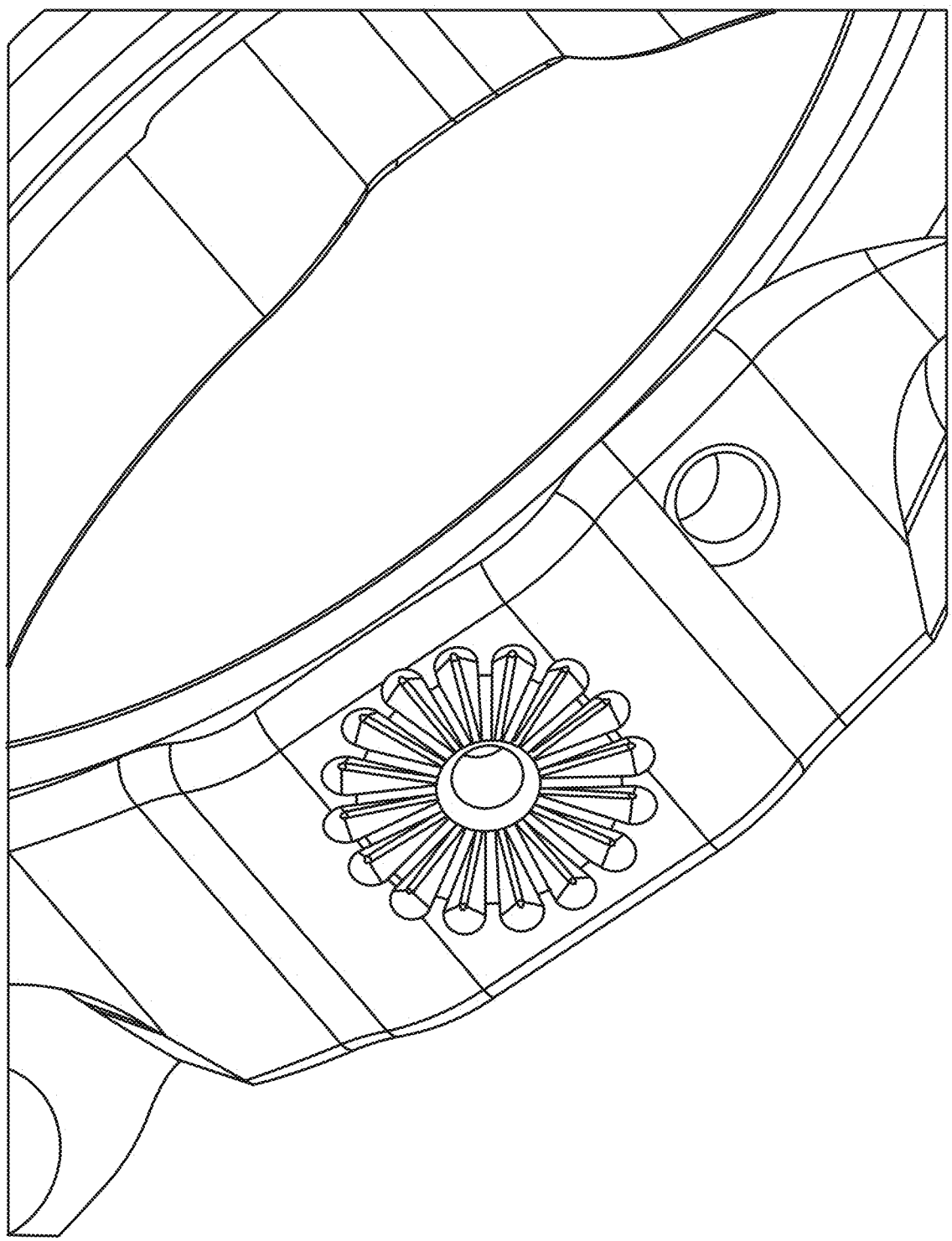
FIG. 14 illustrates an enlarged view of a portion of the apex of FIG. 13.
Figure 15:
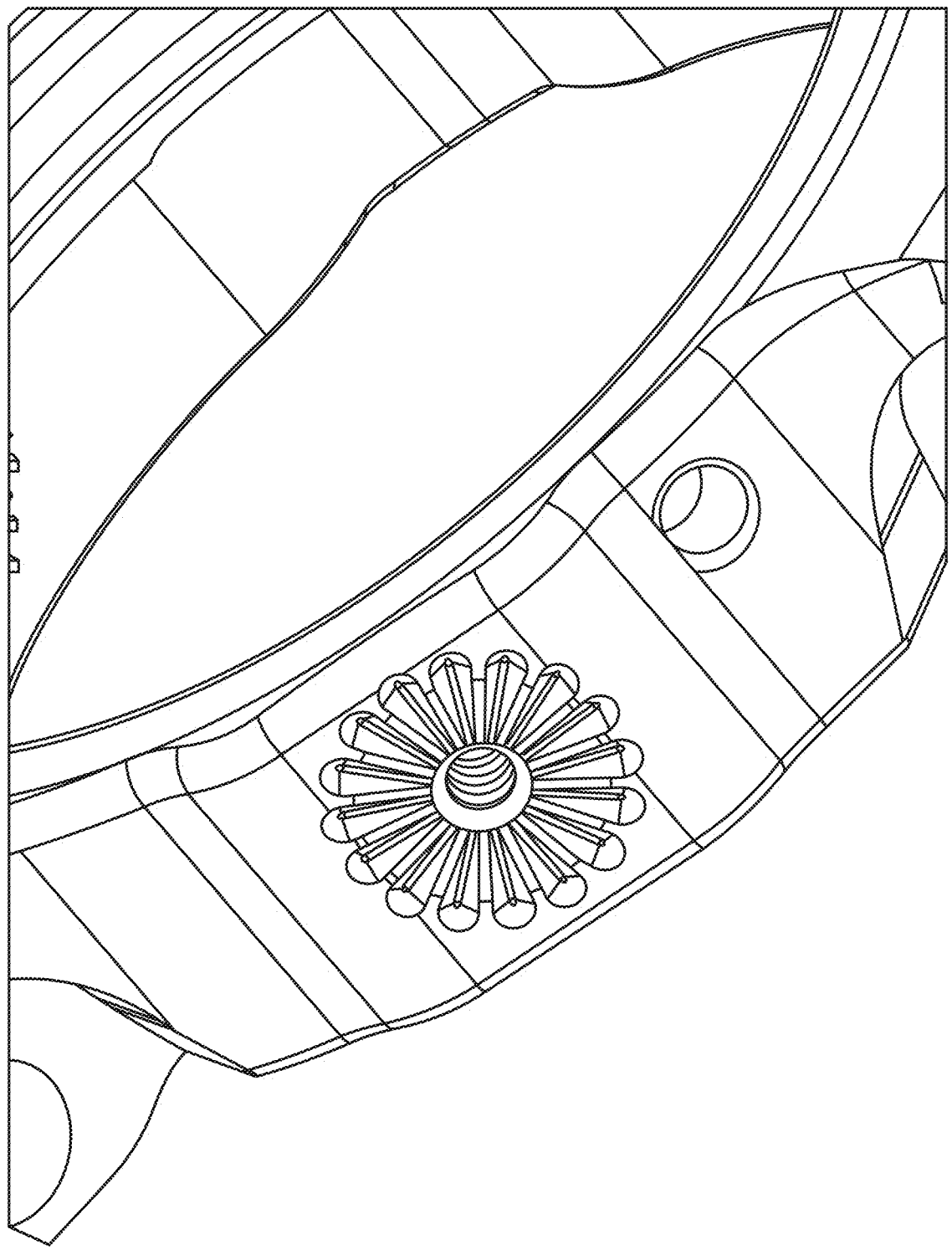
FIG. 15 illustrates a pictorial enlarged view of a portion of the apex of FIG. 13.
Figure 16:
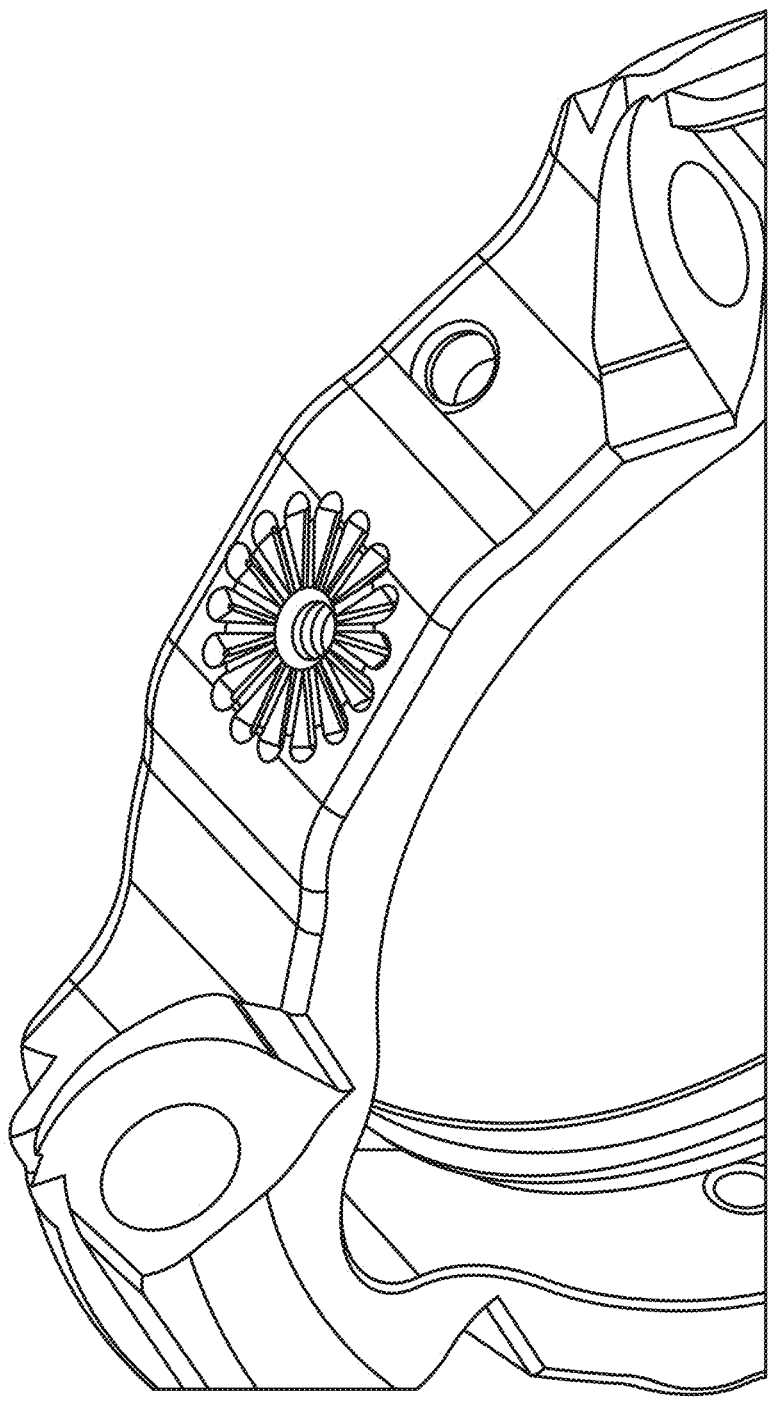
FIG. 16 illustrates another pictorial enlarged view of a portion of the apex of FIG. 13.

Referring to FIG. 12, in some cases it is desirable to include both the substantial number of teeth (e.g., 3 or more) radially arranged on the clamp member, while also including the two teeth compatible groove structure to receive a two teeth arrangement, as previously described. Further, the central opening in the clamp may include a threaded opening or a smooth surface.

The dual interface structure, as described herein, may be used for accessory multi-jointed articulating arm on at least one end, having a single axis pivot or a ball end pivot. The dual interface structure may include matching patterns on each side, with the same or different diameters. Also, the dual interface structure may be used to interconnect other devices together, inclusive of non-photographic equipment, in a manner so that they are retained from rotational movement and transfer stress and pressures effectively.

Referring to FIG. 13, FIG. 14, FIG. 15, and FIG. 16 an apex 1300 for a tripod is illustrated. The apex 1300 includes a central region that can support an imaging device and/or a platform upon which the imaging device is supported. The apex 1300 preferably includes a circular opening defined therein. The apex 1300 may be interconnected to one or more legs of the tripod. An exemplary tripod that includes an apex is illustrated in U.S. Pat. No. 9,371,958, incorporated by reference herein in its entirety.

The apex 1300 includes one or more interface patterns 1310 defined by an exterior sidewall of the apex 1300. The interface pattern 1310 includes a plurality of sloped depressions 1320 axially arranged around a central opening 1330. Another structure, such as a lever arm or otherwise, may include a matching interface pattern of the same size, a smaller size, or a larger size, that is engaged with the interface pattern 1310 on the apex. The structures are secured together such as with a screw with the engaged interface patterns inhibiting rotational movement.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A head suitable to be supported by a tripod or a monopod comprising:
   (a) a rotatable ball contained within a body defining a socket;
   (b) a first movable member that selectively increases and decreases the ability of said ball to freely rotate;
   (c) said rotatable ball including a shaft extending therefrom and a retainment structure at a terminal portion of said shaft to support a device on said head;
   (d) said retainment structure includes at least 16 angularly arranged "V" shaped members, where each of said "V" shaped members extends over a majority of the distance from a central opening defined by said shaft and an exterior peripheral surface defined by said terminal portion of said shaft;
   (e) wherein said shaft defines said central opening in said terminal portion thereof and said terminal portion defines a set of threads within said central opening;
   (f) wherein each said angularly arranged "V" shaped members includes a portion that is between 88 and 93 degrees with respect to one another;
   (g) wherein corresponding pairs of said angularly arranged "V" shaped members includes a portion that define a corresponding valley therebetween that is sloped between 1 and 10 degrees with respect to an axis of said shaft, and wherein corresponding pairs of said angularly arranged "V" shaped members includes an upper surface that is sloped between 1 and 10 degrees with respect to an axis of said shaft;

(h) wherein said retainment structure defines a corresponding valley between corresponding pairs of all of said at least 16 angularly arranged "V" shaped members where said retainment structure is free from including any other structures between a corresponding end of said corresponding valley closest to said central opening of each of said at least 16 angularly arranged "V" shaped members and said central opening.

2. The head of claim 1 wherein each said angularly arranged "V" shaped members is between 90 and 91 degrees with respect to one another.

3. The head of claim 1 wherein each said angularly arranged "V" shaped members is 90.6 degrees with respect to one another.

4. The head of claim 1 wherein corresponding pairs of said angularly arranged "V" shaped members define a corresponding valley therebetween that is sloped between 3 and 8 degrees with respect to an axis of said shaft.

5. The head of claim 1 wherein corresponding pairs of said angularly arranged "V" shaped members define a corresponding valley therebetween that is 5.65 degrees with respect to an axis of said shaft.

6. A head suitable to be supported by a tripod or a monopod comprising:

(a) a rotatable ball contained within a body defining a socket;

(b) a first movable member that selectively increases and decreases the ability of said ball to freely rotate;

(c) said rotatable ball including a shaft extending therefrom and a retainment structure at a terminal portion of said shaft to support a device on said head;

(d) said retainment structure includes at least 16 angularly arranged "V" shaped members, where each of said "V" shaped members extends over a majority of the distance from a central opening defined by said shaft and an exterior peripheral surface defined by said terminal portion of said shaft;

(e) wherein said shaft defines said central opening in said terminal portion thereof and said terminal portion defines a set of threads within said central opening;

(f) at least one of (i) corresponding pairs of said angularly arranged "V" shaped members includes a portion that define a corresponding valley therebetween that is sloped between 1 and 10 degrees with respect to an axis of said shaft, and (ii) corresponding pairs of said angularly arranged "V" shaped members includes an upper surface that is sloped between 1 and 10 degrees with respect to an axis of said shaft;

(g) wherein said retainment structure defines a corresponding valley between corresponding pairs of all of said at least 16 angularly arranged "V" shaped members where said retainment structure is free from including any other structures between a corresponding end of said corresponding valley closest to said central opening of each of said at least 16 angularly arranged "V" shaped members and said central opening.

7. A head suitable to be supported by a tripod or a monopod comprising:

(a) a rotatable ball contained within a body defining a socket;

(b) a first movable member that selectively increases and decreases the ability of said ball to freely rotate;

(c) said rotatable ball including a shaft extending therefrom and a retainment structure at a terminal portion of said shaft to support a device on said head;

(d) said retainment structure includes at least 16 angularly arranged "V" shaped members, where each of said "V" shaped members extends over a majority of the distance from a central opening defined by said shaft and an exterior peripheral surface defined by said terminal portion of said shaft;

(e) wherein said shaft defines said central opening in said terminal portion thereof and said terminal portion defines a set of threads within said central opening;

(f) wherein each said angularly arranged "V" shaped members includes a portion that is between 88 and 93 degrees with respect to one another;

(g) wherein said retainment structure defines a corresponding valley between corresponding pairs of all of said at least 16 angularly arranged "V" shaped members where said retainment structure is free from including any other structures between a corresponding end of said corresponding valley closest to said central opening of each of said at least 16 angularly arranged "V" shaped members and said central opening.

8. The head of claim 7 wherein each said angularly arranged "V" shaped members is between 90 and 91 degrees with respect to one another.

9. The head of claim 7 wherein each said angularly arranged "V" shaped members is 90.6 degrees with respect to one another.

10. The head of claim 7 wherein corresponding pairs of said angularly arranged "V" shaped members define a corresponding valley therebetween that is sloped between 3 and 8 degrees with respect to an axis of said shaft.

11. The head of claim 7 wherein corresponding pairs of said angularly arranged "V" shaped members define a corresponding valley therebetween that is 5.65 degrees with respect to an axis of said shaft.

* * * * *